May 10, 1938.  J. B. BUELL  2,116,961
SUNSHADE FOR AUTOMOBILES
Filed May 14, 1937
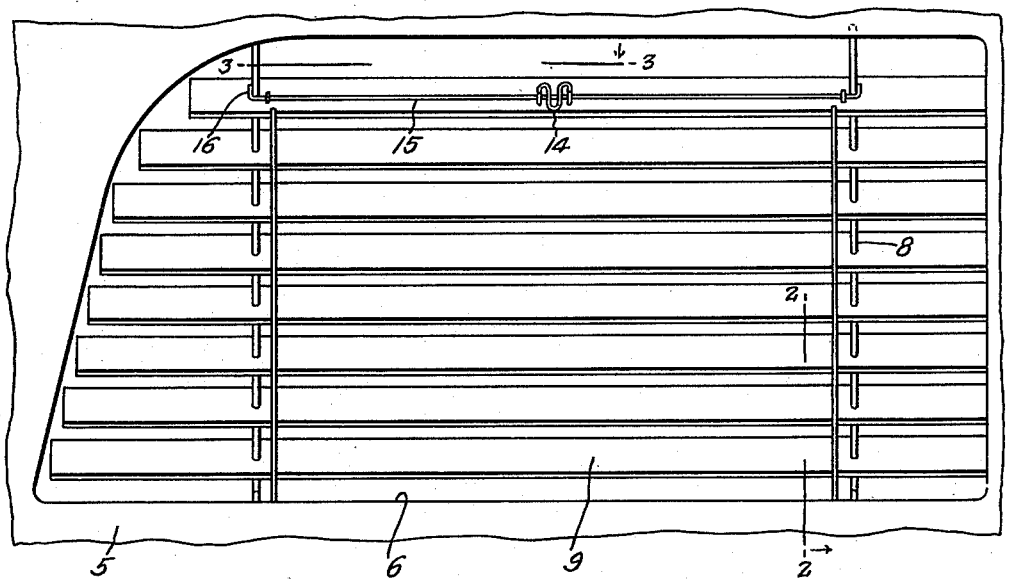
Fig. 1.
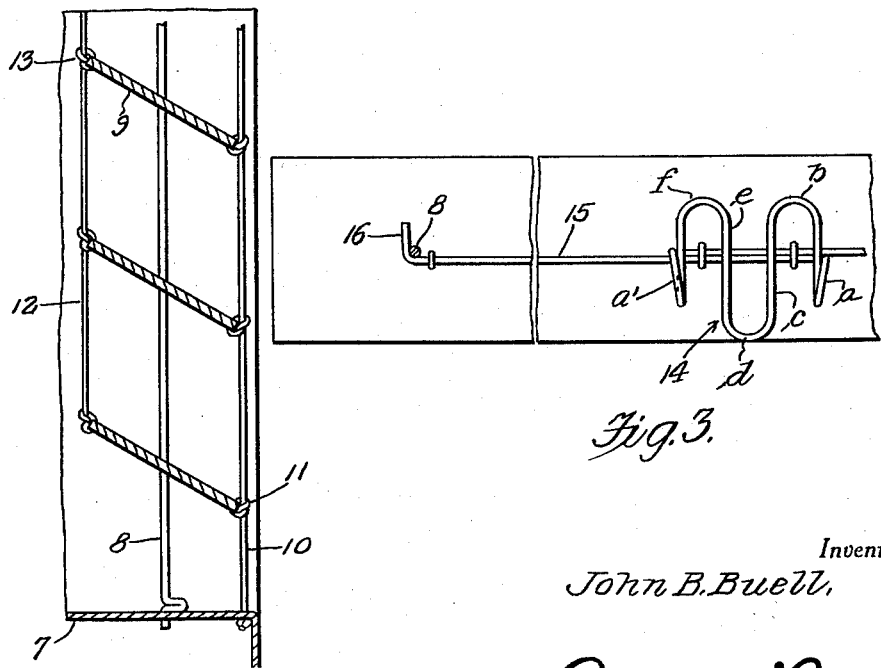
Fig. 2.
Fig. 3.
Inventor
John B. Buell,
By Clarence A. O'Brien
Hyman Berman
Attorneys Patented May 10, 1938

2,116,961

UNITED STATES PATENT OFFICE 2,116,961

SUNSHADE FOR AUTOMOBILES

John B. Buell, Pueblo, Colo.

Application May 14, 1937, Serial No. 142,690

3 Claims. (Cl. 156—17)

This invention appertains to new and useful improvements in sun shades of the Venetian blind type.

The principal object of the present invention is to provide a sun shade which is especially adapted for use in the window openings of automobiles and other vehicles.

Another object of the invention is to provide a sun shade of the Venetian blind type wherein the slats thereof can be elevated to any desired position and retained without any manual effort.

Another important object of the invention is to provide a sun shade which is of simple construction and not susceptible to the ready development of defects.

These and various other important objects and advantages of the invention will become apparent to the reader of the following specification.

In the drawing:—

Figure 1 represents a fragmentary side elevational view showing an automobile window opening with the novel sun shade mounted therein.

Figure 2 represents a vertical fragmentary sectional view taken substantially on the line 2—2 of Figure 1.

Figure 3 represents a fragmentary horizontal sectional view taken substantially on the line 3—3 of Figure 1.

Referring to the drawing wherein like numerals designate like parts, it can be seen in Figure 1 that numeral 5 represents the automobile body having the window opening 6 therein.

In carrying out the present invention, the shade consists of the frame 7 which has the vertically extending guide rods 8 mounted therein. These guide rods extend through openings in the tiltable slats 9, the openings in the slats being oversized so that the same can rock on the guides 8. Strands 10 extend from the lower portion of the frame and are knotted at intervals as at 11 through openings in the edge portions of the slats 9, and in a like manner cords 12 extend downwardly from the upper portion of the frame 7 and are knotted at intervals as at 13 through openings in the inner edge portions of the slats 9.

The retaining means for the shade is generally referred to by numeral 14 and consists of an elongated spring wire member 15 the end portions of which are provided with lateral lug members 16 for engagement against the guide rods 8 as in the manner suggested in Figures 1 and 3.

The intermediate portion of this spring wire member 15 has an overlapping portion which can be best described by referring to Figure 3 and observing one half section of the wire member 15 has its inner end disposed upwardly and looped as at $a$ and then disposed transversely across this end portion and curved backwardly as at $b$ from which point it extends back across the section as at $c$ and is then bent backwardly again at $d$ to recross itself again at $e$. The member is again bent as at $f$ and again crosses itself where it is formed into a second loop $a'$ and extends into position adjacent the end portion of this first-mentioned section to begin the second section from where it extends to terminate in a like hook member 16.

It can now be seen, that by contracting the coiled portions $a$—$a'$, after gripping the same with the thumb and forefinger, the section of the elongated spring member 15 will be moved in opposite longitudinal direction so as to disengage the hook member 16 from the guide 8. Whenever these hook members are thus disengaged from the guides, the slats can be moved upwardly or downwardly with ease. When the slats have been properly adjusted, mere releasement of the coils $a$—$a'$ will cause tensional engagement of the hook members 16 against the guide member so as to retain the slats in the desired adjusted position.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. A shade comprising a plurality of vertically spaced slats, vertically disposed guide members extending through the slats, flexible connecting means between the slats, one of said slats being provided with a spring detent for tensionally engaging one of the said guides.

2. A shade comprising a plurality of vertically spaced slats, vertically disposed guide members extending through the slats, flexible connecting means between the slats, one of said slats being provided with a spring detent for frictionally engaging the said guides.

3. A shade comprising a plurality of vertically spaced slats, vertically disposed guide members extending through the slats, flexible connecting means between the slats, one of said slats being provided with a spring detent for frictionally engaging the said guides, said detent consisting of an elongated spring rod having hook ends for engagement with the said guides and means at its intermediate portion whereby half portions of the said spring member can be slid in opposite directions.

JOHN B. BUELL.